Figure 3:
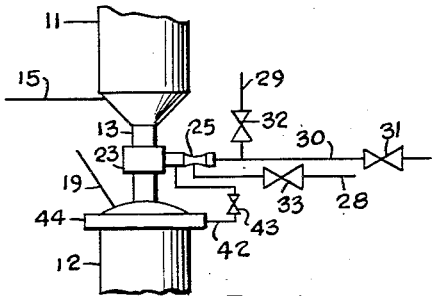

Dec. 28, 1954    H. A. DUTCHER    2,698,350
PEBBLE HEATER APPARATUS
Filed Dec. 21, 1950

INVENTOR.
H. A. DUTCHER
BY Hudson and Young
ATTORNEYS.

United States Patent Office 2,698,350
Patented Dec. 28, 1954

2,698,350

PEBBLE HEATER APPARATUS

Harris A. Dutcher, Bartlesville, Okla., assignor to Phillips Petroleum Company, a corporation of Delaware Application December 21, 1950, Serial No. 202,017

7 Claims. (Cl. 260—679)

This invention relates to a method of and apparatus for effecting heat transfer between gravitating particulate solids and gases or vapors. In one specific aspect it relates to improved apparatus of the "pebble heater" type wherein heat exchange is effected between gases or vapors flowing in direct heat exchange relationship with gravitating particulate solids, or "pebbles," in separate contacting zones interconnected by one or more relatively narrow passageways or throats. Still more specifically the present invention relates to an improved method of preventing the flow of gases between the separate contacting zones via the interconnecting throat of such apparatus while avoiding certain defects of the prior art, as will be explained more fully hereinafter.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

The term "pebble" as used throughout the specification denotes any refractory material in flowable form and size which can be utilized to carry heat from one zone to another. Pebbles are conventionally substantially spherical and are about 1/8" to about 1" in diameter with the preferred size for high temperature processes about 3/8". Pebbles must be of refractory materials which will withstand temperatures at least as high as the highest temperature attained in the pebble heating zone. They may be of ceramic, metal, or other refractory materials, and must be of sufficiently high density to permit high gas flow rates without entrainment of pebbles. Pebbles composed of alumina, beryllia, "carborundum," mullite, periclase, and zirconia when properly fired serve very well at the high temperatures employed in processes and apparatus of the type herein disclosed.

The pebbles are heated in one of the chambers (preferably the upper one) by direct contact therein with hot gases, usually combustion products, to temperatures generally in the range of 1400–3200° F. The hot pebbles are thereafter contacted with the fluid to be superheated or reacted, as the case may be, in the other chamber. Generally pebble inlet temperatures in the second chamber are about 100–200° F. below the highest temperature of the pebbles within the first chamber. In processes for the production of ethylene from light hydrocarbons such as ethane or propane the pebble temperature is usually in the range 1200–1800° F. For the production of acetylene by pyrolysis of hydrocarbons temperatures in the range 1800–3000° F. are desirable. It is usually desirable, and in many cases essential, to prevent gases from passing from one of the contacting chambers to the other via the pebble throat. Thus, the presence of combustion products such as the oxides of carbon in superheated steam, or in reaction products such as acetylene or ethylene, may lead to numerous process difficulties at points in the system downstream from the pebble heater itself. The alternative of permitting even a slight flow of products from the process chamber into the pebble heating chamber is often unattractive economically. While it is theoretically possible, by a careful control of the relative pressures in the two chambers, to maintain a pressure differential so low that no flow can occur, it has been found as a practical matter that such close balancing of pressures often is not feasible. Hence, it has become the practice to introduce a small stream of a sealing or blanketing gas, usually steam, into the throat. Such gas is usually permitted to flow in both directions, i. e., into both the heating chamber and the reactor, thereby preventing flow from either chamber into the other.

While this practice has been of value in preventing flow of gases between chambers, it has been found that the introduction of steam at temperatures at which it is ordinarily most readily available, i. e., 300–1000° F., may result in exposing the pebbles to thermal shock of such magnitude that the useful life of the pebbles is materially shortened. The alternative of employing hot combustion gases for sealing purposes, in order to avoid the effects of thermal shock on pebbles, is often unattractive because of the resulting dilution of products with difficultly separable gases. Thus the art is confronted with the problem of supplying a throat sealing gas at a temperature sufficiently high to avoid thermally shocking the pebbles, without resorting to the use of ordinary products of combustion which, while they can be supplied at high temperatures, are objectionable on other grounds.

It is an object of this invention to provide an improved method of preventing the flow of gases in either direction through a connecting passageway through which contiguous particulate solids are passed between two gas-solids contacting zones.

A further object is to provide an improved method of preventing the flow of gases from the pebble heating chamber to the reaction chamber, or vice versa, in apparatus of the pebble heater type.

Another object is to provide a novel method of sealing the throat of pebble heater type apparatus against the passage of process gases therethrough while avoiding excessive thermal shock of pebbles therein.

Another object is to provide a novel method of protecting refractories at elevated temperature levels against thermal shock.

Another object is to provide an improved method of superheating steam to elevated temperatures above 1500° F.

Still another object of the invention is to provide a method of sealing the throat of pebble heater type apparatus against the leakage of process gases therethrough, whereby dilution of product gases with other difficultly separable gases is substantially prevented.

A still further object is to provide improved pebble heater apparatus and means for supplying a sealing medium to the throat thereof.

Other objects of the invention will be apparent to those skilled in the art, in the light of the accompanying disclosure and drawings.

In accordance with the invention steam to be superheated, for subsequent use in direct contact with refractory materials at elevated temperatures, is admixed with the product of combustion (i. e., steam) of an oxyhydrogen burner, whereby the resulting admixture consists essentially of steam at an elevated temperature approximately the same as that of the refractories with which it is to be contacted. This superheated steam is then employed in accordance with the invention as a sealing gas, or as a protective gas blanket or for similar purposes, without subjecting the hot refractory material to severe thermal shock thereby.

Figure 1:
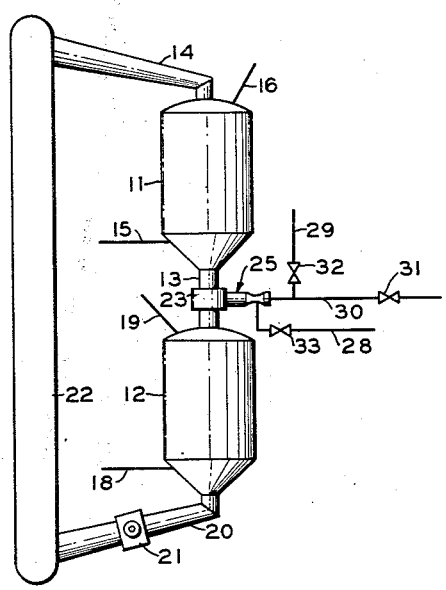
Figure 2:
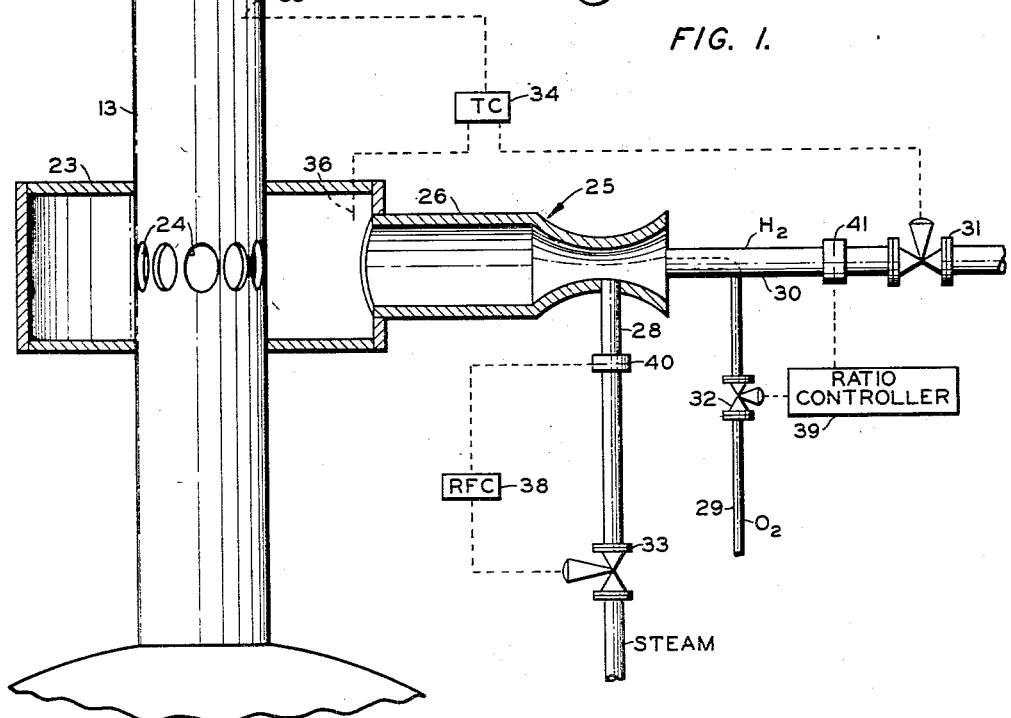

Referring now to the attached drawing, Figure 1 is a schematic showing, in elevation, of a typical pebble heater type apparatus embodying one form of my invention. Figure 2 shows in elevation, partly in section, a means for introducing superheated steam into the throat of the pebble heater apparatus illustrated in Figure 1.
Figure 3 is a partial elevation of pebble heater apparatus illustrating a modification of my invention.

The pebble heater apparatus of Figure 1 comprises gas-solids contacting chambers 11 and 12, preferably in substantially vertical alignment, connected at their adjacent ends by throat 13. Chamber 11 is provided with solids inlet conduit 14 in communication with the upper portion thereof, and with fluid conduits 15 in the lower portion and 16 in the upper portion thereof. Conduit 15 is usually adapted for the introduction of heating gases into chamber 11, which gases may be hot combustion gases from an external source not shown or a combustible gas or gaseous mixture to be burned within a combustion space (not shown) associated with chamber 11. An oxygen-containing gas may be supplied to the combustion space by separate means not shown. Conduit 16 is adapted to remove the spent heating gas from chamber 11.

Chamber 11 is adapted for the continuous gravitation of particulate solids, or "pebbles," therethrough, in one or more streams or beds, in direct contact with the heating gases supplied thereto. Chamber 11 is further adapted to discharge heated pebbles continuously into throat 13.

Chamber 12 is similar to chamber 11 in construction and function, being adapted to receive heated pebbles from throat 13 and to pass them continuously therethrough in direct contact with one or more fluid streams. Chamber 12 is provided with conduits 18 in the lower portion and 19 in the upper portion thereof, either of which may be adapted for the introduction or withdrawal of fluids to be heated by the pebbles in chamber 12. It is usually, but not always, preferred to introduce the fluid to be heated via line 18 and to withdraw the heated fluid in gaseous form via line 19.

Chamber 12 discharges pebbles into a conduit 20, which preferably contains a pebble flow control device indicated schematically at 21. This may be any conventional means for controlling the rate of flow of solids such as a table feeder, star valve, gate valve or the like. Pebbles are discharged from flow control means 21 to the base of an elevator 22 by means of which they are conveyed to the upper end of conduit 14 to complete the cycle of pebble flow. Elevator 22 may comprise a mechanical elevator of the bucket type, a gas lift, or other suitable conveyor means. It will be apparent that, because of the control exerted by flow control device 21 and because of the fact that chambers 11 and 12 and throat 13 permit unobstructed gravitation of pebbles, the pebbles are contiguous from conduit 14 downwardly to flow control device 21. Throat 13, being filled with pebbles and being of smaller diameter than chambers 11 and 12, offers some resistance to the flow of gases therethrough; however, it is often found necessary to supply a sealing gas to throat 13, as mentioned hereinabove, to insure against the undesired flow of gases between chambers 11 and 12. One specific means for accomplishing this result in accordance with my invention is particularly shown in Figure 2.

Figure 2 shows throat 13 provided at a point intermediate its ends with a bustle ring 23 at least partially encircling throat 13 and adapted to admit sealing steam to throat 13 through a plurality of openings 24 in the wall thereof. Communicating with bustle ring 23 is a burner assembly 25 comprising mixer 26, steam inlet line 28, and pipes 29 and 30. As shown in the drawing, pipe 29 may be employed to admit gaseous oxygen to burner 25 and pipe 30 to admit hydrogen, both from sources not shown. Pipe 29 may join pipe 30 at a point a short distance from the inlet end of mixer 26, or pipe 29 may be made concentric with pipe 30 a short distance from mixer 26, as shown. Both pipes 29 and 30 discharge into the inlet end of mixer 26, in which combustion occurs. Steam inlet line 28 enters mixer 26 at an intermediate point, and the discharge end of mixer 26 communicates with bustle ring 23, as shown. Mixer 26 and bustle ring 23 are lined with suitable high temperature refractories capable of withstanding the elevated temperatures developed therein. That portion of throat 13 which is exposed to the high temperature steam is, of course, also comprised of suitable refractory material. The flow of hydrogen is under the control of valve 31 in line 30, while the flow of oxygen is controlled by valve 32 in line 29. Valve 33 is provided in line 28 for controlling the flow of steam therethrough.

A differential temperature controller 34 is adapted to control the flow of hydrogen through valve 31 in response to the temperature differential indicated by thermocouples 35 and 36. Thermocouple 35 is preferably located in the upper portion of throat 13 so as to indicate the temperature of the pebbles therein, and thermocouple 36 is disposed and adapted to indicate the temperature of the steam in bustle ring 23.

A rate of flow controller 38 is adapted to control the flow of steam through valve 33 in response to pressure drop across orifice 40 in line 28, and a ratio controller 39 is provided to control the flow of oxygen through valve 32 in response to the pressure drop across orifice 41 in hydrogen supply line 30.

In the operation of the system of this invention, steam is admitted through line 28 at a rate established by the setting of rate of flow controller 38 which actuates valve 33. As will be explained more fully hereinbelow, the quantity of steam so supplied will depend upon operating conditions in chambers 11 and 12. Rate of flow controller 38, while preferred, is not essential; valve 33 can be controlled manually. The function of burner 25 is to superheat the steam admitted via line 28 to a predetermined elevated temperature approximately equal to the temperature of the pebbles in throat 13. Hence differential temperature controller 34 is set to regulate the supply of hydrogen to burner 25 by actuating valve 31 at a rate such that the temperature indicated by thermocouple 36 is maintained at a temperature usually substantially equal to that indicated by thermocouple 35. Obviously, the source of heat is the combustion of the hydrogen with oxygen admitted via line 29, and the function of ratio controller 39 is to control valve 32 in response to the rate of flow of hydrogen in line 30 so as to admit oxygen in substantially the proportion required for complete combustion, i. e., in stoichiometric proportion. The steam admitted via line 28 tempers the steam produced by combustion, so that the resulting admixture reaching bustle ring 23 is at the temperature called for by temperature controller 34, i. e., usually substantially the temperature of the pebbles in throat 13.

The steam in bustle ring 23 passes through openings 24 into throat 13 and flows into both chambers 11 and 12, at a rate sufficient to prevent both the flow of combustion products from chamber 11 and the flow of heated gases from chamber 12 into throat 13 (and thence into the other chamber). It is preferred to operate chambers 11 and 12 at substantially equal pressures, but a small differential pressure may be permitted if a sufficient quantity of sealing steam is provided.

*Specific example*

In a commercial pebble heater unit in which pebbles are circulated at a rate of from 40,000 to 50,000 pounds per hour sealing steam is introduced at a rate of 200 pounds per hour to prevent gas flow from either chamber into the throat. In accordance with this invention, apparatus like that shown in Figure 2 is employed to superheat the sealing steam from 300° F. to the temperature of the pebbles in the throat. Hydrogen is supplied to burner 25 at a rate of 776 standard cubic feet per hour (SCFH) and oxygen at a rate of 388 SCFH. The resulting steam product is admixed with 200 pounds per hour of steam at 300° F., producing 236.9 pounds per hour of steam at 2000° F., the temperature of the pebbles in throat 13, and the admixture is introduced into the throat as described hereinabove.

While it is preferred to control the temperature of the sealing steam at a value substantially equal to that of the pebbles in the throat, the invention has utility even when a considerable difference in temperature is permitted. A steam temperature within 500° F. and preferably within 200° F. of the pebble temperature is usually satisfactory. Substantially greater temperature differences than this, however, result in damage to pebbles due to thermal shock.

Obviously, if the major portion of the steam were available from conveniently located sources at higher temperatures, less hydrogen and oxygen would be required to produce sealing steam at any given final temperature. In general, a weight ratio of steam to oxy-hydrogen combustion product of from about 5:1 to 15:1, preferably from about 8:1 to 10:1, is satisfactory, ratios in the lower portion of this range being used when very high pebble temperatures are employed, and the higher ratios used when pebble temperatures are lower. Since it is preferred to operate with stoichiometric proportions of hydrogen and oxygen, control of the temperature of the final admixture of sealing steam is preferably accomplished by varying the above-mentioned ratio, as described hereinabove.

The data set forth in the table show the deleterious effect of thermal shock on the crushing strength of pebbles. Crushing strength is an important measure of useful pebble life since pebbles having lowered crushing strength break rapidly while in service and must be replaced. Thermal shock results from very rapid temperature changes, such as when very hot pebbles are immersed in boiling water or placed in an atmosphere of relatively low temperature steam or other fluid. Thus at least those pebbles exposed to direct contact with relatively low temperature sealing steam in the pebble heater throat are subjected to thermal shock. Ordinary countercurrent contact of pebbles with gases in direct heat exchange, on the other hand, normally does not result in thermal shock because the temperature change undergone by the pebbles is much more gradual.

TABLE

*Results of thermal shock-crushing strength tests*

| Pebble | Crushing Strength, lbs./sq. in. | | | |
|---|---|---|---|---|
| | Initial | After 10 quenches from temp. indicated | | |
| | | 1,500° F. | 1,000° F. | 800° F. |
| A | 1,370 | 800 | | |
| B | 1,790 | 910 | 740 | 850 |
| C | 1,520 | 900 | 970 | 1,130 |
| D | 600 | 390 | 200 | 280 |
| E | 1,840 | | 1,220 | 1,220 |
| F | 1,520 | | | 1,220 |

The test results recorded in the table were obtained from shock tests of commercial refractory pebbles. Crushing strength was measured by crushing the pebbles between hardened parallel plates, one attached to the piston of a hydraulic jack and the other to a yoke mounted on the jack. Hydraulic pressure required to crush the pebble was read on a pressure gauge equipped with a maximum pressure indicator. Quenching was accomplished by suddenly immersing the pebbles into boiling water after they had been heated to the indicated temperature. It will be noted that there is a substantial loss in crushing strength in every case.

While I have explained my invention with particular reference to a presently preferred embodiment, the foregoing disclosure should not be construed to limit the scope of the invention unduly. Various modifications of this invention are within the skill of the art and are intended to be included in the scope of this disclosure. In addition, the invention may find utility in other applications involving the use of sealing steam in contact with refractories at elevated temperatures. One such application is in preventing carbon deposition in a reactor such as reactor 12 when a hydrocarbon conversion process is being conducted therein. The function of the steam in this instance is to provide a gas blanket between the reactant hydrocarbons and the reactor wall, above the surface of the pebble bed, so as to prevent the deposition and accumulation of carbon or "coke" on the reactor wall. In accordance with this application of the invention, steam superheated to a temperature substantially the same as that in the upper part of the reactor is introduced at a plurality of points around the periphery of the reactor, so as to provide the desired blanketing effect without lowering the reaction temperature as is the case when low temperature steam is so employed. This application of my invention is illustrated in Figure 3 which shows a line 42 containing a valve 43 and connecting a burner assembly 25 to a header member 44. Header member 44, which encompasses the upper portion of reactor 12, provides means for introducing superheated steam into the reactor at a plurality of points around the periphery of the reactor.

The invention is also applicable to pebble heater apparatus comprising more than two chambers in vertical alignment and having relatively narrow interconnecting throats therebetween. Just as in the case of two-chamber units, sealing steam is advantageously employed at the temperature of the flowing solids in each of such throats.

I claim:
1. In a method for the transfer of heat to a fluid at elevated temperature levels which comprises heating particulate heat transfer solids to a temperature above 1200° F. by direct contact with hot gases in a first contacting zone, gravitating said heated solids through a relatively narrow interconnecting zone to a second contacting zone therebelow, and contacting a fluid with said heated solids in said second zone so as to effect the transfer of heat therebetween; the improvement which comprises introducing gaseous hydrogen and oxygen in stoichiometric proportions into a combustion zone and burning said hydrogen and oxygen therein, adding and mixing steam with the product formed by said burning thereby raising the temperature of said added steam to a temperature within 500° F. of the solids in said interconnecting zone, and introducing said resulting admixture into said interconnecting zone at a rate sufficient to prevent the flow of fluids therethrough between said first and second zones.

2. The method according to claim 1, wherein the temperature of said resulting admixture is within 200° F. of the temperature of the solids in said interconnecting zone.

3. In a method for the production of acetylene which comprises heating particulate heat transfer solids to a temperature within the range 2000–3200° F. by direct contact with hot gases in a first contacting zone, gravitating said solids through a relatively narrow interconnecting zone into a second contacting zone therebelow and therein contacting said heated solids with a fluid hydrocarbon under acetylene forming conditions, removing gaseous reaction products from said second zone, and recovering acetylene therefrom as a product of the process; the improvement which comprises introducing steam into said interconnecting zone at a rate sufficient to prevent the flow of said hot gases into said second contacting zone and the flow of said reaction products into said first contacting zone, said steam being superheated to a temperature within 200° F. of the temperature of the solids passing through said interconnecting zone by admixture thereof with the products of combustion of hydrogen with oxygen.

4. In a method for the production of ethylene which comprises heating particulate heat transfer solids to a temperature within the range 1200–1800° F. by direct contact with hot gases in a first contacting zone, gravitating said solids through a relatively narrow interconnecting zone into a second contacting zone therebelow and therein contacting said heated solids with a fluid hydrocarbon under ethylene forming conditions, removing gaseous reaction products from said second zone and recovering ethylene therefrom as a product of the process; the improvement which comprises introducing steam into said interconnecting zone at a rate sufficient to prevent the flow of said hot gases into said second contacting zone and the flow of said reaction products into said first contacting zone, said steam being superheated to a temperature within 200° F. of the temperature of the solids passing through said interconnecting zone by admixture thereof with the products of combustion of a gas consisting essentially of hydrogen with stoichiometric proportions of a gas consisting essentially of oxygen.

5. Apparatus for the direct transfer of heat between gravitating particulate solids and gases comprising at least two chambers in substantially vertical alignment, each having a fluid conduit in communication with its lowermost portion and a separate fluid conduit in communication with its uppermost portion; an inlet for solids in the upper portion of the uppermost one of said chambers; an outlet for solids in the lower portion of the lowermost one of said chambers; a relatively narrow unobstructed passageway connecting the lower portion of each chamber with the upper portion of the chamber next therebelow; a mixing chamber communicating with said passageway at an intermediate point thereof; a burner discharging into said mixing chamber; a steam inlet in communication with said mixing chamber; a first supply line connected to said burner for supplying hydrogen thereto; a second supply line connected to said burner for supplying oxygen thereto; an elevator connected at its lower end to said outlet for solids and at its upper end to said inlet for solids; a first valve in said first supply line, a second valve in said second supply line; a first temperature responsive means located within said passageway upstream of said mixing chamber; a second temperature responsive means located within said mixing chamber; a differential temperature controller operatively connected to said first and second temperature responsive means and to said first valve so as to open said first valve when said first temperature responsive means is at a predetermined greater temperature than said second temperature responsive means, and to close said first valve when the temperatures of said first and second temperature responsive means are substantially equal; and a flow controller connected to said first supply line and responsive to the rate of flow of hydrogen therethrough, said controller being further operatively connected to said second valve.

6. Pebble heater apparatus comprising upper and lower chambers each provided with at least one fluid conduit in its upper and lower ends and each adapted for the separate contacting of gases with particulate solids, said chambers being connected by a relatively narrow throat therebetween; an inlet for the introduction of steam into said throat at a midpoint thereof; a mixing chamber connected to and communicating with said steam inlet; an oxy-hydrogen burner connected to and communicating with said mixing chamber; a steam conduit communicating with said mixing chamber; a first conduit connected to said burner for introducing hydrogen thereinto; a second conduit connected to said burner for introducing oxygen thereinto; a first temperature responsive means located within said throat upstream of said mixing chamber; a second temperature responsive means located within said mixing chamber; temperature control means connected to said first and second temperature responsive means; a first valve in said first conduit operatively connected to said temperature control means; a fluid control means connected to said first conduit and responsive to rates of flow of fluid therethrough; and a second valve in said second conduit operatively connected to said fluid control means.

7. A method according to claim 1 wherein said fluid contacted with said heated solids in said second contacting zone is a hydrocarbon and wherein additional resulting admixture is passed into the upstream end of said second contacting zone.

References Cited in the file of this patent

UNITED STATES PATENTS

| Number | Name | Date |
|---|---|---|
| 2,343,866 | Hincke | Mar. 14, 1944 |
| 2,377,245 | Krejci | May 29, 1945 |
| 2,377,847 | Allen et al. | June 12, 1945 |
| 2,387,378 | Wolk | Oct. 23, 1945 |
| 2,466,005 | Crowley | Apr. 5, 1949 |
| 2,477,019 | Utterback et al. | July 26, 1949 |
| 2,477,502 | Utterback et al. | July 26, 1949 |
| 2,532,613 | Dutcher | Dec. 5, 1950 |
| 2,541,693 | Frevel et al. | Feb. 13, 1951 |
| 2,551,905 | Robinson | May 8, 1951 |